United States Patent [19]
Ashida et al.

[11] Patent Number: 5,260,344
[45] Date of Patent: Nov. 9, 1993

[54] OPEN CELL RIGID ISOCYANURATE FOAMS AND METHOD FOR PRODUCING THE SAME AND VACUUM HEAT INSULATING LAYER BY USE OF THE SAME

[75] Inventors: Kaneyoshi Ashida; Josho Kashiwame, both of Farmington Hills, Mich.

[73] Assignee: Asahi Glass Company, Ltd., Tokyo, Japan

[21] Appl. No.: 850,816

[22] Filed: Mar. 13, 1992

[51] Int. Cl.$^5$ .................... C08J 9/14; C08G 18/42; C08G 18/48
[52] U.S. Cl. .................... 521/131; 521/155; 521/159; 521/170; 521/172; 521/174; 521/175; 521/902
[58] Field of Search ............... 521/131, 155, 159, 170, 521/172, 174, 175, 902

[56] References Cited

U.S. PATENT DOCUMENTS

| | | | |
|---|---|---|---|
| 3,621,872 | 11/1971 | Fisher | 137/494 |
| 3,931,065 | 1/1976 | Ashida et al. | 521/174 |
| 3,941,726 | 3/1976 | Wiedermann et al. | 521/155 |
| 3,998,766 | 12/1976 | Kan et al. | 521/902 |
| 4,052,347 | 10/1977 | Dieterich et al. | 521/174 |
| 4,129,697 | 12/1978 | Schäpel et al. | 521/160 |
| 4,234,693 | 11/1980 | Wooler | 521/160 |
| 4,247,656 | 1/1981 | Janssen | 521/174 |
| 4,546,120 | 10/1985 | Peerman et al. | 521/159 |
| 4,590,224 | 5/1986 | Frisch, Jr. | 521/155 |
| 4,623,673 | 11/1986 | DeGuiseppi et al. | 521/160 |
| 4,668,555 | 5/1987 | Uekado et al. | 428/71 |
| 4,908,161 | 3/1990 | Ashida | 521/123 |
| 5,132,332 | 7/1992 | Wallaeys et al. | 521/131 |

OTHER PUBLICATIONS

ASTM Designation: D3014-76, "Standard Test Method for Flame Height, Time of Burning, and Loss of Weight of Rigid Cellular Plastics . . . " pp. 777–781.
ANSI/ASTM D1621-73, "Standard Test Method for Compressive Properties of Rigid Cellular Plastics".
ANSI/ASTM C421-77, "Standard Test Method for Tumbling Friability of Preformed Block-Type Thermal Insulation".
ASTM Designation: D2858-70 (Reapproved 1976), "Standard Test Method for Open Cell Content of Rigid Cellular Plastics by the Air Pycnometer".

*Primary Examiner*—John Kight, III
*Assistant Examiner*—Rabon Sergent
*Attorney, Agent, or Firm*—Oblon, Spivak, McClelland, Maier & Neustadt

[57] ABSTRACT

Rigid isocyanurate foams having a substantially open cell structure are prepared by foaming a mixture of an organic polyisocyanate and a polyol having a NCO-/OH equivalent ratio of 3.5 to 13.

25 Claims, No Drawings

OPEN CELL RIGID ISOCYANURATE FOAMS AND METHOD FOR PRODUCING THE SAME AND VACUUM HEAT INSULATING LAYER BY USE OF THE SAME

BACKGROUND OF THE INVENTION

1. Field of the Invention

This invention concerns new isocyanurate foams obtained from organic polyisocyanates and organic polyols and having a substantially open-cell structure, a method for producing them, and vacuum insulation layers that make use of them, such as, for example, insulating walls in refrigerators or deep freezers.

2. Discussion of the Background

It is well known that rigid urethane foams and rigid isocyanurate foams can be obtained by causing organic polyisocyanates and organic polyols to react in the presence of blowing agents, and they are widely used as insulating materials. A feature of rigid isocyanurate foams is that, because they have isocyanurate linkages in their polymer structure, they have better flame- and heat-resistance than rigid urethane foams.

Whereas rigid urethane foams are usually obtained by causing organic polyisocyanate and organic polyol to react in the presence of tin catalysts or tertiary amine catalysts so as to bring the NCO/OH equivalent ratio to about 0.9-1.2, rigid isocyanurate foams are obtained by causing their reaction in the presence of trimerization catalysts so as to bring the NCO/OH equivalent ratio to about 3.0 or greater. Generally, at an NCO/OH equivalent ratio of 3.0 or less there is little isocyanurate linkage, and therefore not much improvement can be expected in flame- and heat-resistance, and conversely if the NCO/OH equivalent ratio is too high, the foam becomes brittle and unsuitable for use. In order to obtain good flame resistance, heat resistance, and mechanical properties, the reactions should be made to take place so that the trimer percentage given by the following formula (1) reaches 18-22%.

$$\% \text{ Trimer} = 4200 \frac{Ei - Eh}{Wi + Wh} \quad (1)$$

In formula (1), $Ei$ is the number of isocyanate equivalents, $Eh$ is the number of hydroxyl equivalents, $Wi$ is the weight of isocyanate, and $Wh$ is the weight of polyol.

Also, because of their advantages such as low thermal conductivity, inertness, low boiling point, and nonflammability, chlorofluorocarbons (CFCs) such as trichloromonofluoromethane (CFC-11) have been used as the best blowing agents for producing rigid urethane foams and rigid isocyanurate foams.

Very recently, due to the ozone depletion problem, CFCs are requested to be phased out by 1995. Alternative physical blowing agents include HCFCs (hydrogenated chlorofluorocarbons), such as HCFC-123 ($CHCl_2CF_3$) and HCFC-141b ($CH_3CCl_2F$).

Rigid urethane foams and rigid isocyanurate foams manufactured as described above all have a closed cell structure, normally having a closed cell content of 80-95%. This leads to a high degree of heat insulation. However, in heat insulation using such closed cell foam it is inevitable that there will be heat conduction by the blowing agents in gas form that are enclosed inside the closed cells, and over a long period of time the blowing agents will gradually be replaced by air, which has a higher thermal conductivity, thereby lowering the heat insulation performance even further.

It is well known that, theoretically, the vacuum state has the lowest thermal conductivity and yields excellent heat insulation, and proposals have been put forth for vacuum insulating layers in which the core material is an open cell rigid urethane foam. Examples include Japanese patent application Kokai No. 82-133870 and U.S. Pat. No. 4,668,555.

In the former, a closed cell urethane foam is first made in the conventional way. Then, in a vacuum under high temperature and high humidity conditions, the cell walls are broken to produce an open cell structure. This technique requires generating a vacuum over a long period of time to produce open cells, and it is difficult to produce a completely open cell foam.

In the latter technique, blocked open cell rigid urethane foam is produced by using a cell opening material such as calcium stearate, but it is unclear whether this technique can produce open cells within panels by direct pour-in-place process when applied to refrigerators or the like. In U.S. Pat. No. 4,668,555, a vacuum heat insulating layer is obtained by cutting the produced blocked open cell foam into sheets and vacuum-sealing them in a laminate film consisting of metal and plastic. When actually applied to refrigerators, the process is complicated and not practical. A more serious matter is that this patent uses $CCl_3F$ (trichloromono-fluoromethane) as the blowing agent, but because this substance destroys the ozone layer, it will no longer be used after the year 2000, and thus the method of this patent is undesirable. No other method is known for making open cell rigid foam using other blowing agents.

Moreover, both of the above patents are for rigid urethane foam having an NCO/OH equivalent ratio of 3.0 or less, which can hardly be said to be flame- or heat-resistant. It has thus far not been possible to obtain, with essentially isocyanurate foam, a foam having an open cell structure whose NCO/OH equivalent ratio exceeds 3.0 and that has superior flame- and heat-resistance.

SUMMARY OF THE INVENTION

In view of the problems described above, one object of the present invention is to provide new rigid isocyanurate foams of a substantially open cell structure that have excellent flame- and heat-resistance and are suitable as a core material for vacuum heat insulating layers, a method of manufacturing these foams that does not use CFCs, and a vacuum insulating body that makes use of these foams.

As the term is used in this invention, "isocyanurate foam having a substantially open cell structure" means an isocyanurate foam in which the NCO/OH equivalent ratio is in the range 3.5-13, and has an open cell content of 50% or more as measured by ASTMD-2856-70. This invention also provides a method of manufacturing rigid isocyanurate foam using organic polyisocyanates and organic polyols whose NCO/OH equivalent ratio is in the range 3.5-13, in the presence of catalysts and surfactants, using the following blowing agents:

(A) hydrocarbons having a boiling point of 20°-100° C., and (B) chlorinated hydrocarbons having a boiling point of 20°-100° C., and having at least one hydrogen atom in their molecule in a specific A:B ratio. This invention further provides a vacuum insulating body having an open cell rigid isocyanurate foam and gas barrier material.

DETAILED DESCRIPTION OF THE PREFERRED EMBODIMENTS

The organic polyisocyanates used in this invention have the following general formula (2)

$$R(NCO)_m \qquad (2)$$

where R denotes aromatic, aliphatic, aralkyl, alicyclic groups and mixtures thereof, and m is an integer greater than or equal to 2.

Preferred organic polyisocyanates which may be used in the present invention are those which have been generally used for production of flexible polyurethane foams, rigid polyurethane foams, isocyanurate foams, etc. Suitable organic polyisocyanates are described, for example, in U.S. Pat. No. 4,908,161 which is incorporated herein by reference in its entirety for a more complete description of these polyisocyanates.

Specific examples are 2,4-toluene diisocyanate, 2,6-toluene diisocyanate, crude toluene diisocyanate, polyisocyanates expressed by the following general formula (3) where n is an integer from 0-10,

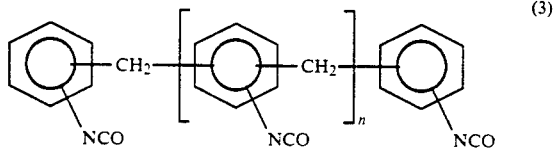

as well as aromatic polyisocyanates such as 4,4',4'''-triphenylmethane triisocyanate and 4,4'-dimethyldiphenylmethane-2,2',5,5'-tetraisocyanate, aralkyl polyisocyanates such as xylylene diisocyanate, aliphatic polyisocyanates such as hexamethylene-1,6-diisocyanate, isophorone diisocyanate, and 2,4,4-trimethylhexamethylene-1,6-diisocyanate, and mixtures of two or more of these. One can also use polyisocyanates such as hydrogenated diphenylmethane diisocyanate, m-phenylene diisocyanate, naphthalene-1,5-diisocyanate, 1-methoxyphenyl-2,4-diisocyanate, 4,4'-biphenylene diisocyanate, 3,3'-dimethyl-4,4'-biphenyl diisocyanate, and 3,3'-dimethyl diphenylmethane-4,4'-diisocyanate.

As still other types of polyisocyanates, one can also use isocyanate terminated quasi-prepolymers. These quasi-prepolymers are produced by the reaction of excess polyisocyanates with a small amount of active hydrogen-containing compounds. Desirable active hydrogen-containing compounds are compounds that contain at least two active hydrogens and can react with isocyanates, for example, alkylene diols, hydroxyl group containing polyesters, polyalkylene ether polyols, hydroxyl terminated urethane oligomers, polyhydric polythioethers, ethylene oxide adducts of phosphorus-containing acids, polyacetals, aliphatic polyols, aliphatic thiols having two or more SH groups, and compounds and mixtures containing two or more of the above-listed groups per molecule.

Preferred isocyanate (NCO) terminated prepolymers are aromatic prepolymers containing 20-30 weight percent terminal NCO groups.

As yet other types of organic polyisocyanates, one can also use carbodiimide-modified diphenylmethane diisocyanate, allophanate-modified toluene diisocyanate, urea-modified toluene diisocyanate, and oxazolidone-modified toluene diisocyanate. Among these organic polyisocyanates, aliphatic polyisocyanates are generally undesirable because of their low reactivity, and it is preferable to use aromatic polyisocyanates.

Preferred carbodiimide modified diphenylmethane polyisocyanates are aromatic polyisocyanates containing 25-35 weight percent terminal NCO groups.

In order to obtain a foam that is superior in flame resistance, heat resistance, and mechanical properties, it is most preferable to use polyisocyanates expressed by the general formula (3). Specifically, these include 4,4'-diphenylmethane diisocyanate, its 2,4'-isomer and 2,2'-isomer, polymeric diphenylmethane diisocyanate, and mixtures of these.

A polymeric diphenylmethane diisocyanate means one in which the variable n in formula (3) is greater than zero, and the average functionality, i.e. the number of NCO groups per molecule, is the range of 2.2-3.0. Polymeric diphenylmethane diisocyanates are usually produced by phosgenation of condensation products of aniline and formaldehyde, but of course one can also use those that are manufactured by other methods that do not make use of phosgene (e.g., S. Fukuoka, M. Chono et al., Int'l Progress in Urethane, Vol. 5, p. 1, Technomic Publishing Co., Inc.). Liquid mixtures of the foregoing are readily available; the most desirable are those in which the average NCO functionality is in the range 2.0-3.5.

The polyols used in this invention include compounds that have two or more hydroxyl groups in their molecule. Any polyols which have been generally used for production of flexible polyurethane foams, rigid polyurethane foams, modified polyisocyanurate foams, etc, may be used as the polyol of the present invention. Suitable polyols are disclosed, for example, in U.S. Pat. No. 4,908,161.

Typical polyols are polyester polyols and polyether polyols, but also include polycarbonate polyols (DURACARB, PPG Ind.), hydantoin-polyols (DANTOCOL DHE, Lonza Inc.), and polyolefinic polyols (POLYBD, Atochem Co.). Preferable polyester polyols are those that are obtained from polycarboxylic acids, especially aliphatic or aromatic dicarboxylic acids, and from polyhydric alcohols, especially glycols. Preferable carboxylic acids include oxalic acid, malonic acid, succinic acid, glutaric acid, adipic acid, isophthalic acid, maleic acid, and mixtures of these. Preferable polyhydric alcohols include ethylene glycol, diethylene glycol, 1,3-propylene glycol, 1,4-butane diol, glycerine, neopentyl glycol, and phenol derivatives such as bisphenol A. Among other polyester polyols it is preferable to also use polyester polyols that are produced by ring opening polymerization of lactones such as ε-caprolactone. Polyesteramides containing amine or aminoalcohol groups can also be used.

Preferable polyalkylene polyether polyols are polymerization products with polyhydric alcohols (initiator) and alkylene oxide. As polyhydric alcohols, bifunctional through octofunctional hydroxyl compounds may be used, for example, ethylene glycol, trimethylol propane, pentaerythritol, alpha-methyl glucoside, sorbitol and sucrose. Sucrose and other polysaccharides can also be used. Alkylene oxides that can be used include ethylene oxide, propylene oxide, butylene oxide, amylene oxide, and mixtures of these. Polymers of active hydrogen containing compounds (initiators) other than the aforementioned polyalcohol with alkylene oxide can also be used. Examples are polymers of aniline or 2,4-toluene diamine with propylene oxide. Among the polyalkylene polyether polyols that can be used are those prepared by polymerizing tetrahydrofuran, alkylene oxide, epihalohydrins such as epichlorohydrin and aralkylene oxides such as styrene oxide.

Polyhydric polythioethers such as the condensation products of thioglycol and the reaction products of the aforementioned dihydric alcohols, with thioether glycol can also be used.

Alkylene oxide adducts of sulfuric acid or phosphoric acid can be used as well.

In addition, one can also use aliphatic thiols such as 1,2-ethanedithiol, 1,2-propanedithiol, 2-butene-1,4-dithiol, and 3-hexylene-1,6-dithiol, aliphatic diols such as ethylene glycol, 1,3-propylene glycol, and 1,4-butane diol, and aliphatic triols such as glycerol, trimethylolpropane and pentaerythritol.

These polyols can be used either singly or in mixtures of two or more kinds, and it is preferable that the hydroxyl equivalent weight be in the range 30-3000. More preferably hydroxyl equivalent weights are in a range of 30 to 300, and a OH functionality of 2 to 8.

Moreover, the polyisocyanates and polyols include those that are mentioned in (1) Saundeis, J. H. and Frisch, K. C., Polyurethanes, Chemistry and Technology, Part I-Chemistry, Interscience Publishers (1962); (2) Oerter, G., Polyurethane Handbook, Hunser Publishers (1985); and (3) Wood, G., The ICI Polyurethanes Book, John Wiley & Sons, 1990.

The amount ratio of the aforementioned organic polyisocyanates and polyols should be a ratio whereby the NCO/OH equivalent ratio is in the range 3.5-13, and preferably 5-10; a lower value is undesirable because then the flame- and heat resistance would be poor and the foam is prone to shrinkage. A higher value is undesirable because then generally the foam becomes brittle. Within this range, the most desirable range is one in which the trimer percentage given by formula (1) is in the range 18-25%, and preferably 20-25%.

The best hydrocarbon blowing agents to use in this invention are those having a boiling point of about 20°-100° C. As such compounds, one can use aliphatic hydrocarbons, preferably $C_{5-8}$ aliphatic hydrocarbons such as n-pentane, i-pentane, n-hexane, heptane, dimethylethylmethane, 2-methylpentane, 2,3-dimethylbutane, 1-pentene, 2-methylbutene, 3-mentylbutene, and 1-hexene, $C_{6-10}$ aromatics such as benzene, and $C_{5-8}$ cycloaliphatic hydrocarbons such as cyclohexane and cyclopentane. The blowing agents can be used either singly or in mixtures of two or more. n-Pentane is particularly preferred.

As the chlorinated hydrocarbon blowing agents having at least one hydrogen in the molecule that can be used in this invention, those having a boiling point of 20°-100° C. are preferred. Such compounds include $C_{1-4}$ halohydrocarbons such as n-propyl chloride, isopropyl chloride, isobutyl chloride, t-butyl chloride, methylene chloride, chloroform, ethylene dichloride, trichloroethylene, 1,1,1-trifluoro-2,2-dichloroethane ($CF_3CHCl_2$: HCFC-123), and 1,1-dichloro-1-fluoroethane ($CFCl_2CH_3$: HCFC-141b); they can be used either singly or in mixtures of two or more. Methylene chloride is particularly preferred.

The blowing agent used in order to produce this invention's isocyanurate foam having a substantially open cell structure is a mixture of the aforementioned (A) hydrocarbon and (B) chlorinated hydrocarbon having at least one hydrogen in its molecule, and the proportion (A):(B) by weight should be in the range from 5:95 to 50:50. A proportion of (A) that is smaller is undesirable because then cracks and voids occur in the foam, and a larger proportion is undesirable because then an open cell structure cannot easily be obtained and the proportion of closed cells will increase.

A preferred proportion (A):(B) is in the range from 10:90 to 30:70.

The surfactants that can be used in this invention are any that are used for normal rigid urethane foam or isocyanurate foam production; for example, commercially available products such as polymethyl siloxane-polyoxyalkylene block copolymers. The amount of such surfactants to use is 0.1-3 parts, and preferably 1-2 parts, per 100 parts of organic polyisocyanate, by weight.

Any catalyst that is a normal trimerization catalyst for isocyanates can be used in this invention. It is preferable to use the catalysts disclosed in U.S. Pat. No. 3,931,065, the proceedings of SPI urethane conferences, Toronto, Canada, 1986 "Nobel Catalyst for Isocyanate Reactions", Advances in Urethane Sciences and Technology V.3 pp 141-164 (1974), J. Cellular Plastics V.14 pp 332-340 (1978), and the *Handbook of Polymeric Foams and Foam Technology* edited by Frisch, K. C. and Klempnor, D., pp 98-101 (1991). The most preferred are catalysts expressed by the following formula (4).

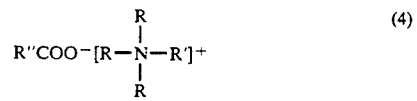

where R represents a methyl or ethyl group, R' represents a hydroxy hydrocarbon group having 2-3 carbon atoms, and R" represents hydrogen or a $C_{1-8}$ hydrocarbon group. Specific examples include trimethyl hydroxypropyl ammonium carboxylates, such as trimethyl hydroxypropyl ammonium formate and trimethyl hydroxypropyl ammonium 2-ethylhexanoate. These catalysts are available commercially from Air Products Co. under the trade names DABCO TMR and DABCO TMR-2.

The amount of these catalysts used is generally about 0.1-5.0 parts, and preferably 1-4 parts, per 100 parts organic polyisocyanate, by weight.

Any equipment that can manufacture normal rigid urethane foam or isocyanurate foam can be used for manufacturing the isocyanurate foam having a substantially open cell structure of the present invention. In other words, it is possible to manufacture the isocyanurate foam at ambient temperatures by mixing and stirring polyol containing the prescribed quantities of catalyst, surfactant, and blowing agent with the prescribed quantity of organic polyisocyanate, then injecting the mixture into the desired kind of mold. The quantity of blowing agent varies depending on the desired density of the foam and normally is not necessarily constrained as long as it is about 5-20 parts per 100 parts organic polyisocyanate.

The isocyanurate foam thus obtained has an open cell content of at least 50%, preferably 70%, more preferably 80% or greater, exhibits superior flame resistance and physical properties, and makes a suitable core material for a vacuum insulating body.

The vacuum insulating body of this invention has an outer barrier layer or frame made of gas-barrier material (gas impermeable) and, as the core material, the rigid isocyanurate foam having a substantially open cell structure described above. The gas-barrier frame materials of the vacuum insulating body of the present invention prepared by a pour-in-place injection process include any material which has sufficient gas-barrier properties to function in the pour-in-place process. Specifically, films, foils or plates of metals such as iron, copper, aluminum and steel, as well as thermoplastic polymers, thermosetting polymers and composites thereof may be used as the gas barrier frame material. Plastic composites containing reinforcing fillers such as glass fiber, carbon fiber, steel fiber, glass mat, glass clothe, inorganic powders, etc. are suitable for use as the gas-barrier material of the present invention. Metallized plastics are particularly preferred. The shape of the gas-barrier frame material is not specifically restricted and will vary according to the desired application. The outer barrier material may have any desired three dimensional shape, i.e., a box, bag, disk, cylinder, plate, etc.

The rigid isocyanurate foam used in the vacuum insulating layer should have a density of at least 2.2 pounds per cubic foot (pcf), and preferably at least 2.5 pcf. Densities lower than this generally do not provide sufficient compressive strength and are undesirable because differences in pressure inside and outside the vacuum insulating layer will cause deformation.

Although there are no particular restrictions on the method of manufacturing the vacuum insulating layer of this invention, one simple method is to produce the layer by using a pour-in-place process to make the aforementioned rigid isocyanurate foam having a substantially open cell structure inside a shaped material, i.e., a box, forming a sufficiently high gas barrier, then evacuate the inside of the shaped material and seal it. Before the evacuation the rigid isocyanurate foam should have a high open cell content; the evacuation can be easily completed if this content is at least 80%.

The vacuum insulation layer thus formed, being a vacuum, exhibits superior heat insulation, has excellent flame resistance, and can be applied as heat insulation in many household uses such as refrigerators and freezers and industrial uses such as refrigerated vehicles.

Other features of the invention will be become apparent in the course of the following descriptions of exemplary embodiments which are given for illustration of the invention but are not intended to be limiting thereof.

EXAMPLES

The various foam physical properties were measured in conformity to the following methods.

open cell content: ASTM D-2856-70 procedure B
Butler chimney: ASTM D-3014-76
compressive strength: ASTM D-1621-73
Friability: ASTM C-421-77

EXAMPLES 1–3

Isocyanurate foam was manufactured in a one-shot process using a methylene chloride/pentane mixture (80/20 by weight) as the blowing agent. The raw materials listed in Table 1 were used, and the quantity of blowing agent was varied. The results are listed in Table 1.

TABLE 1

| Ingredient (parts by weight) | 1 | 2 | 3 |
|---|---|---|---|
| PAPI 580[1] | 100 | 100 | 100 |
| PLURACOL TP-440[2] | 10.1 | 10.1 | 10.1 |
| DC-193[3] | 1.5 | 1.5 | 1.5 |
| DABCO TMR-2[4] | 3.0 | 3.0 | 3.0 |
| $CH_2Cl_2$/pentane (80/20) | 7.0 | 10.0 | 12.0 |
| NCO/OH equivalent ratio | 10 | 10 | 10 |
| Percent trimer | 24.7 | 24.7 | 24.7 |
| Processing | | | |
| Cream time (sec) | 35 | 35 | 37 |
| Rise time (sec) | 70 | 74 | 70 |
| Tack free time (sec) | 53 | 52 | 53 |
| Properties | | | |
| Density (pcf) | 3.2 | 2.8 | 2.2 |
| open cell content (%) | 95 | 96 | 96 |
| Butler chimney (%) | 92 | 88 | 83 |
| compressive strength (kg/cm$^2$) | 1.5 | 1.2 | 0.8 |
| Friability (%) | 30 | 35 | 37 |

[1] polymeric MDI (Eq. wt. 139) from Dow Chemical
[2] polyether polyol (Eq. wt. 141) from BASF Corporation
[3] silicon surfactant from Dow Corning
[4] trimerization catalyst from Air Products Co.

From Table 1, each foam shows a high open cell content and a high Butler chimney flame resistance.

EXAMPLES 4 AND 5, COMPARISON EXAMPLES A AND B

Isocyanurate foams were manufactured in the same way as in examples 1–3, except that the NCO/OH equivalent ratio was varied. The results are listed in table 2.

TABLE 2

| Ingredient (pbw) | Examples | | Comparison Examples | |
|---|---|---|---|---|
| | 4 | 5 | A | B |
| PAPI 580 | 100 | 100 | 100 | 100 |
| PLURACOL TP-440 | 14.5 | 20 | 6.8 | 40.6 |
| DC-193 | 1.5 | 1.5 | 1.5 | 1.5 |
| DABCO TMR-2 | 3.0 | 3.0 | 3.0 | 3.0 |
| $CH_2Cl_2$/pentane (80/20) | 10.0 | 11.0 | 10.0 | 13.0 |
| NCO/OH equivalent ratio | 7 | 5 | 15 | 2.5 |
| Percent trimer | 23.8 | 20.2 | 26.4 | 12.9 |
| Processing | | | | |
| Cream time (sec) | 35 | 38 | 36 | 33 |
| Rise time (sec) | 75 | 65 | 70 | 60 |
| Tack free time (sec) | 52 | 52 | 55 | 50 |
| Properties | | | | |
| Density (pcf) | 2.8 | 2.7 | 2.8 | foam shrinks |
| Open cell content (%) | 92 | 89 | 95 | |
| Butler chimney (%) | 88 | 87 | 93 | |
| Compressive strength (kg/cm$^2$) | 1.4 | 1.6 | 1.0 | |
| Friability (%) | 32 | 29 | 50 | |

From Table 2 it can be seen that every foam has a high open cell content and a high Butler chimney flame resistance. At an NCO/OH equivalent ratio of 15 only foam having weak mechanical strength can be obtained, and at 2.5 the foam shrinks.

EXAMPLES 6 AND 7, COMPARISON EXAMPLES C AND D

Isocyanurate foams were manufactured in the same way as in example 1 except that the methylene chloride/pentane mixture ratio was varied. The results are given in Table 3.

TABLE 3

| Ingredient (pbw) | Comparison Example C | Examples 3 | Examples 6 | Examples 7 | Comparison Example D |
|---|---|---|---|---|---|
| PAPI 580 | 100 | 100 | 100 | 100 | 100 |
| PLURACOL TP-440 | 10.1 | 10.1 | 10.1 | 10.1 | 10.1 |
| DC-193 | 1.5 | 1.5 | 1.5 | 1.5 | 1.5 |
| DABCO TMR-2 | 3.0 | 3.0 | 3.0 | 3.0 | 3.0 |
| $CH_2Cl_2$ | 12 | 9.6 | 8.4 | 6.0 | 0 |
| Pentane | 0 | 2.4 | 3.6 | 6.0 | 12 |
| NCO/OH eq. ratio | 10 | 10 | 10 | 10 | 10 |
| Processing | | | | | |
| Cream time (sec) | 32 | 37 | 36 | 33 | 50 |
| Rise time (sec) | 40 | 70 | 70 | 75 | 120 |
| Tack free time (sec) | 40 | 53 | 55 | 60 | 120 |
| Properties | | | | | |
| Density (pcf) | 2.6 | 2.2 | 2.2 | 2.2 | 2.2 |
| Open cell (%) content | 90 | 96 | 83 | 54 | 33 |
| Appearance | 1) | 2) | 2) | 2) | 3) |

1) large voids and coarse cells
2) fine cells
3) coarse cells

Good foams could not be obtained with the single use of methylene chloride. The single use of pentane gave foams having low open cell content which was far from having the desired open cell content (see Comparison Example D).

The single use of methylene chlorides resulted in large voids and coarse cells, which caused deformation of the insulating layer and/or outer barrier layers by vacuum.

EXAMPLES 8-10, COMPARISON EXAMPLE E

Isocyanurate foams were manufactured in the same way as in example I, except that a trichloroethylene/pentane mixture was used as the blowing agent, and the mixture ratio was varied. The results are given in Table 4.

TABLE 4

| Ingredient (pbw) | Comparison example E | Examples 8 | Examples 9 | Examples 10 |
|---|---|---|---|---|
| PAPI (580) | 100 | 100 | 100 | 100 |
| PLURACOL TP-440 | 10.1 | 10.1 | 10.1 | 10.1 |
| DC-193 | 1.5 | 1.5 | 1.5 | 1.5 |
| DABCO TMR-2 | 3.0 | 3.0 | 3.0 | 3.0 |
| Trichloroethylene | 12 | 9.6 | 8.4 | 6.0 |
| Pentane | 0 | 2.4 | 3.6 | 6.0 |
| NCO/OH ratio | 10 | 10 | 10 | 10 |
| Processing | | | | |
| Cream time (sec) | 32 | 35 | 37 | 33 |
| Rise time (sec) | 45 | 54 | 55 | 57 |
| Tack free time (sec) | 45 | 54 | 55 | 57 |
| Properties | | | | |
| Density (pcf) | — | 3.2 | 2.9 | 2.6 |
| Open cell content (%) | — | 90 | 86 | 63 |
| Appearance | 1) | 2) | 2) | 2) |

1) large voids and coarse cells
2) fine cells
Good foam could not be obtained with trichloroethylene alone.

EXAMPLES 11 AND 12

Isocyanurate foams were manufactured by mixing and stirring at room temperature the ingredients listed in Table 5, then immediately injecting the mixture into 7"×6"×2" steel molds with passage of air heated to 50° C., causing it to foam, then removing the foam from the molds 5 minutes later. The results are shown in Table 5.

TABLE 5

| Ingredients (pbw) | 11 | 12 |
|---|---|---|
| PAPI 580 | 100 | 100 |
| PLURACOL TP-440 | 10.1 | 10.1 |
| DC-193 | 1.5 | 1.5 |
| DABCO TMR-2 | 3.0 | 3.0 |
| $CH_2Cl_2$/pentane (80/20) | 12 | — |
| $CHClCCl_2$/pentane (80/20) | — | 20 |
| NCO/OH equivalent ratio | 10 | 10 |
| Properties | | |
| Density (pcf) overall | 3.4 | 3.3 |
| core | 2.5 | 2.7 |
| Open cell content (%) core | 81 | 85 |

EXAMPLES 13 AND 14

In examples 13 and 14 isocyanurate foams were manufactured by the same procedure as in examples 11 and 12, respectively, except that instead of passage air, molds were used that had an evacuating valve on their top. After foaming, post-curing took place for 1 hour at 120° C. with the foam kept in the mold, then at room temperature the pressure was reduced, via the air bleeder valve using a vacuum pump, to 0.1 mmHg and kept at that pressure for 1 hour. Thereafter the interior of the mold was restored to ambient pressure, and after removal of the foam from the mold the open cell content of its core portion was measured; it was 98% in example 13 and 96% in example 14. It was observed that depressurization raises the open cell content.

In manufacturing rigid isocyanurate foam, new isocyanurate foams having a substantially open cell structure can be produced by using, as the flowing agent, a specified-ratio mixture of hydrocarbons and chlorinated hydrocarbons having at least one hydrogen in their molecule. Also, because no CFCs are used as the blowing agent, there is no harm to the environment. Such open cell rigid isocyanurate foam exhibits superior flame resistance and is useful as the core material for vacuum insulating layers. Vacuum insulating layers produced in this way have high thermal insulation and high flame resistance. Because no residue of blowing agent remains in the insulating layer, when such an insulating layer is used for refrigerators or the like, there is no occurrence of stress cracks in the materials from which the refrigerator is made, which is a problem that is often observed in systems in which closed cell foam is used and residues of blowing agent remain in the foam.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rigid isocyanurate foam having substantially open cell structure, prepared by foaming a mixture comprising an organic aromatic polyisocyanate and a polyol in an NCO/OH equivalent ratio of 3.5 to 13, wherein said polyol is selected from the group consisting of polyether polyols and polyester polyols having a hydroxyl equivalent weight of 30 to 3,000 and a OH functionality of 2 to 8 per molecule, wherein said foam is prepared by a method comprising the steps of:
   reacting an organic polyisocyanate with a polyol in an NCO/OH equivalent ratio of 3.5 to 13 in the presence of:
   a) a blowing agent comprising a solvent blend of a hydrocarbon having a boiling point of about 20° C. to 100° C. and a chlorinated hydrocarbon containing at least one hydrogen atom and having a boiling point of about 20° C. to 100° C., wherein, the weight ratio of said hydrocarbon to said chlorinated hydrocarbon is between about 5:95 an 50:50,
   b) a trimerization catalyst, and
   c) optionally, a surfactant.

2. The rigid isocyanurate foam of claim 1, wherein said aromatic polyisocyanate is selected from the group consisting of monomeric diphenylmethane diisocyanates, polymeric diphenylmethane diisocyanates and mixtures thereof.

3. The rigid isocyanurate foam of claim 1, wherein said aromatic polyisocyanate is the product, obtained by phosgenating the condensation product of aniline and formaldehyde having the structure:

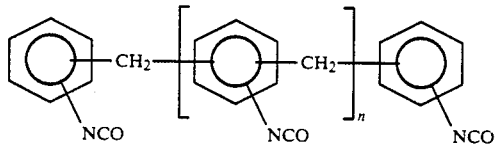

wherein n is an integer from 0 to 10.

4. The rigid isocyanurate foam of claim 1, wherein said aromatic polyisocyanate has an average NCO functionality from 2.0 to 3.5 per molecule.

5. The rigid isocyanurate foam of claim 1, wherein said aromatic polyisocyanate is a prepolymer prepared by the reaction of diphenylmethane diisocyanate with a polyol, wherein the weight % of terminal NCO groups is from 20 to 30.

6. The rigid isocyanurate foam of claim 1, wherein said aromatic polyisocyanate is a carbodiimide modified diphenylmethane diisocyanate having a weight % of terminal NCO groups from 25 to 35.

7. The rigid isocyanurate foam of claim 1, wherein said polyol is selected from the group consisting of polyether polyols having an equivalent weight of 30 to 3000 and a OH functionality of 2 to 8 per mole.

8. The rigid isocyanurate foam of claim 7, wherein said polyol is selected from the group consisting of polyether polyols having an equivalent weight of 30 to 300 and a OH functionality of 2 to 8.

9. The rigid isocyanurate foam of claim 8, wherein said polyol is selected from the group consisting of trimethylol propane-based polyether polyols, sucrose-based polyether polyols, and mixtures thereof.

10. The rigid isocyanurate foam of claim 1, wherein said rigid isocyanurate foam has an open cell content of at least 50% by volume.

11. The rigid isocyanurate foam of claim 1, wherein said rigid isocyanurate foam has an open cell content of at least 70% by volume.

12. The rigid isocyanurate foam of claim 1, wherein said rigid isocyanurate foam has an open cell content of at least 80% by volume.

13. A method of making a rigid isocyanurate foam having substantially open cell structure, comprising the steps of:
   reacting an organic polyisocyanate with a polyol in an NCO/OH equivalent ratio of 3.5 to 13 in the presence of:
   (a) a blowing agent comprising a solvent blend of a hydrocarbon having a boiling point of about 20° C. to 100° C. and a chlorinated hydrocarbon containing at least one hydrogen atom and having a boiling point of about 20° C. to 100° C., wherein the weight ratio of said hydrocarbon to said chlorinated hydrocarbon is between about 5:95 and 50:50,
   (b) a trimerization catalyst, and
   (c) optionally, a surfactant.

14. The method of claim 13, wherein said weight ratio of hydrocarbon to chlorinated hydrocarbon is between 10:90 and 30:70.

15. The method of claim 13, wherein said hydrocarbon is selected from the group consisting of n-pentane, 2-pentane, n-hexane, heptane, dimethylethylmethane, 2-methylpentane, 2,3-dimethylbutane, 1-pentene, 2 methylbutene, 3-methylbutene, 1-hexene, cyclopentane, cyclohexane, benzene and mixtures thereof.

16. The method of claim 13, wherein said chlorinated hydrocarbon is selected from the group consisting of propyl chloride, isopropyl chloride, butyl chloride, isobutyl chloride, methylene chloride, chloroform, ethylene dichloride, trichloroethylene, 1,1,1-trifluoro-2,2-dichloroethane, 1,1-dichloro-1-fluroethane and mixtures thereof.

17. The method of claim 13, wherein said organic polyisocyanate is an aromatic polyisocyanate.

18. The method of claim 17, wherein said aromatic polyisocyanate is selected from the group consisting of monomeric diphenylmethane diisocyanates, polymeric diphenylmethane diisocyanates and mixtures thereof.

19. The method of claim 17, wherein said aromatic polyisocyanate is the product, obtained by phosgenating the condensation production of aniline and formaldehyde, having the structure:

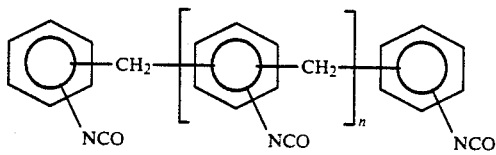

wherein n is an integer of 0 to 10.

20. The method of claim 17, wherein said aromatic polyisocyanate has an average NCO functionality from 2.0 to 3.5.

21. The method of claim 17, wherein said aromatic polyisocyanate is a prepolymer prepared by the reaction of diphenylmethane diisocyanate with a polyol, wherein the weight % of terminal NCO groups is from 20 to 30.

22. The method of claim 17, wherein said aromatic polyisocyanate is cardodiimide modified diphenylmethane diisocyanate having a weight % of terminal NCO groups from 25 to 35.

23. The method of claim 13, wherein said polyol is selected from the group consisting of polyether polyols and polyester polyols having an equivalent weight of 30 to 3000 and a OH functionality of 2 to 8 per molecule.

24. The method of claim 23, wherein said polyol is selected from the group consisting of polyether polyols having an equivalent weight of 30 to 300 and a OH functionality of 2 to 8.

25. The method of claim 24, wherein said polyol is selected, from the group consisting of trimethylol propane-based polyether polyols, sucrose-based polyether polyols and mixtures thereof.

* * * * *